United States Patent Office 3,175,958
Patented Mar. 30, 1965

3,175,958
THERMAL BARRIER FOR NUCLEAR
REACTOR VESSEL
Pierre Bourgade, Melun, France, assignor to
Sté Indatom, Paris, France
Filed May 29, 1963, Ser. No. 284,096
Claims priority, application France, May 30, 1962,
899,322
5 Claims. (Cl. 176—87)

In certain nuclear reactors of the type which are cooled by a circulation of gas under pressure, the functions both of mechanical resistance to pressure and of gas-tightness are carried out by separate means, namely:

A vessel constructed for prestressed concrete for the purpose of providing resistance to pressure, And a leak-tight lining membrane, of steel for example, inside said concrete pressure vessel.

Under these conditions, one of the difficult problems created by the use of a structure of this kind consists in the thermal insulation of the concrete which, in order to retain its physical properties to the fullest extent, must not be heated above a certain temperature whereas the gases which pass through the reactor core can easily be at temperature which can vary according to circumstances between 200 and 800° C.

This problem is completely different from that of the recovery of heat which is transmitted to the lining sheets of conventional boiler furnaces: the recovery of heat in this case is usually carried out by means of nests of tubes which are not juxtaposed and through which circulates an emulsion of water and steam, said tubes being interposed between the inner fire-box sheet (which is necessary in order to prevent the adhesion of ashes or clinker) and the wall of refractory bricks. The difficulty in that case is not to protect the refractory bricks but to prevent the destruction of those portions of the inner sheet which are not directly in contact with the tubes. It is necessary either to make use of a thick inner sheet having high heat conductivity transversely to its thickness or to construct a sheet of a material which withstands high temperatures and which is therefore costly. In any case, the thermal power which is absorbed by the tube nests represents a high proportion of the total power of the boiler.

Moreover, the pressure which prevails in a boiler furnace is sufficiently low and the temperature sufficiently high for the processes of heat transfer to be mainly due to radiation. On the contrary, in a nuclear reactor, the relative value of the two factors which have just been mentioned is reversed and the predominant processes are those of heat transfer by convection.

One solution to the problem of maintaining the concrete at an acceptable temperature has been suggested, and this consists in covering the inner face of the steel lining membrane with a substantial layer of insulating material (such as glass wool) and metallic sheets and in providing along the interface of the steel lining membrane and the prestressed concrete a nest of cooling tubes through which a coolant circulates.

However, this mode of operation is attended by a certain number of disadvantages which make it undesirable. Among such disadvantages can be cited the following:

No suitable action can be taken to remedy the existence of any hot points in the steel membrane which may result from local failure of the insulation;

There arises a danger of rapid impairment of said insulation (assembly of glass wool and sheet metal) under the action of pressure cycling of the coolant gas and gas streams between zones of different pressure. These dangers are also common to all structural materials about which relatively little is known as regards their behaviour in the course of time.

In certain special cases, it is impossible to to recover usefully the overall thermal losses which can be of a high order.

The present invention has for its object a thermal barrier for a nuclear reactor vessel which makes it possible to overcome the above-mentioned disadvantages and which essentially comprises against the internal face of the leak-tight lining membrane at least one nest of cooling tubes through which a coolant is intended to circulate, said tubes being housed in a non-continuous manner in the interior of a metallic jacket formed by two oppositely facing sheets, at least one of which is corrugated and attached over all or a part of the internal surface of the leak-tight lining membrane.

In accordance with a particular feature of the present invention, the two sheets which form the jacket are of unequal thickness. The inner sheet which is in contact with the coolant gas is thin (of the order of one millimeter as a maximum) and is endowed by virtue of its low longitudinal conductivity with a thermal resistance which is not negligible when compared with the surface resistance which results from contact between the sheet and the coolant gas. The second sheet, however, has a greater thickness (at least a few millimeters) and constitutes a veritable thermal short-circuit which maintains the entire leak-tight lining membrane at the same temperature in order to protect this latter.

Among the substantial advantages of the new structure in accordance with the invention can be mentioned the fact that the continuity of the metallic jacket over the whole internal wall of the reactor core containment vessel makes it possible to prevent the forced convection of the coolant gas along the leak-tight lining membrane (which results from the pressure gradient which is usually present), thereby eliminating any risk of undesirable hot points occurring in said lining membrane and making it possible to reduce to an appreciable extent the heat flux removed by the coolant which flows through the tubes. Furthermore, in the particular case of a nuclear reactor in which the primary exchanger is integrated in the core containment vessel, the practical application of the invention sometimes makes it possible to recover under better conditions a part of the heat which has thus been extracted.

Reference being made to the accompanying diagrammatic FIGURES 1 to 5, there will be described below various examples which are not given in any limitative sense and which relate to the practical application of the thermal barrier for a nuclear reactor vessel, in accordance with the invention. The constructional arrangements which will be described in connection with said examples must be considered as forming part of the invention, it being understood that any equivalent arrangements can also be employed without thereby departing from the scope of the invention.

There have only been illustrated in the different figures those elements which are necessary to obtain an understanding of the invention while the corresponding elements of the different figures have been designated by identical reference numerals.

Figure 1:
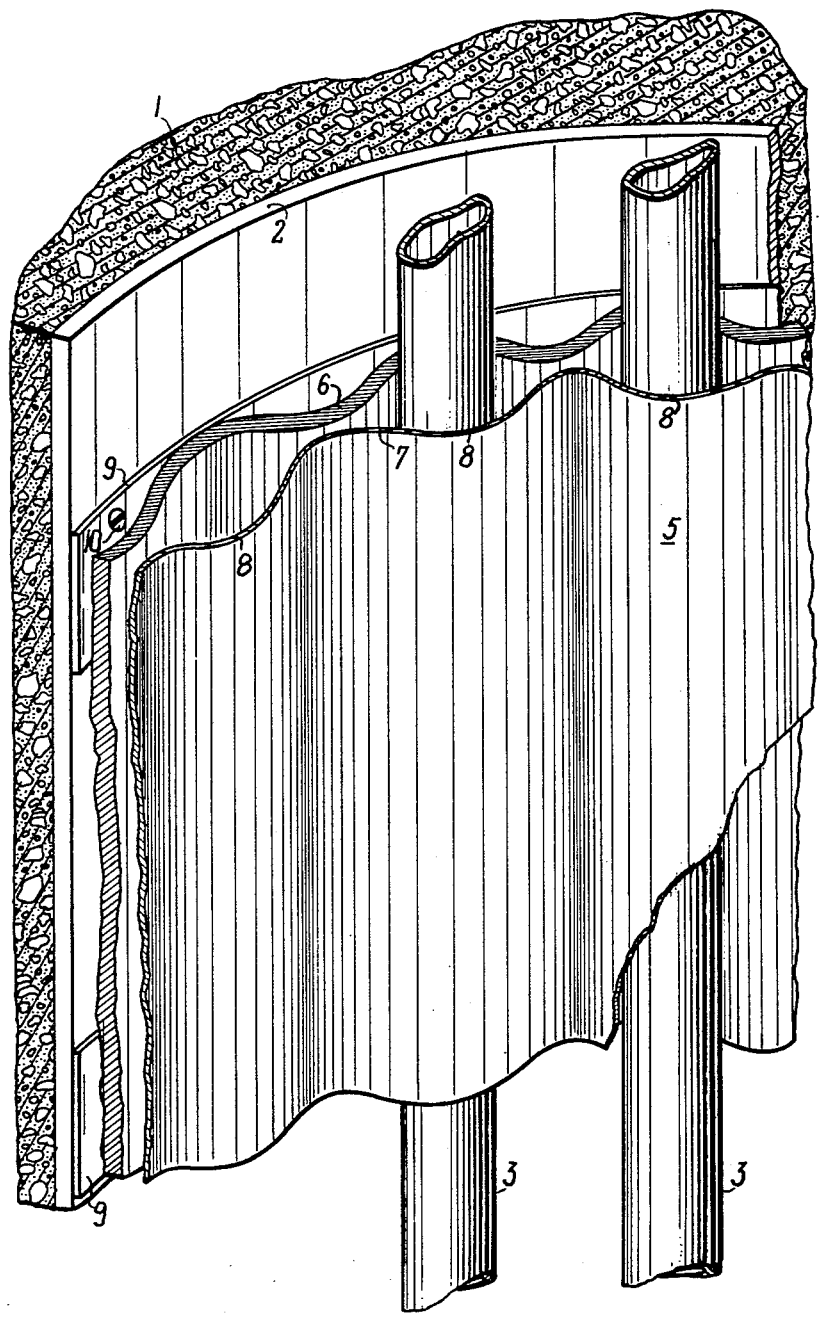
FIG. 1 is a general view taken in perspective of a portion of the nuclear reactor vessel in which use is made of one of the possible arrangements of the new thermal barrier in accordance with the invention.

There has been shown in FIG. 1 a portion of the prestressed concrete vessel 1 which is designed to withstand the pressure within the reactor and the steel membrane 2 which covers the concrete and ensures leak-tightness with respect to the coolant gas.

In accordance with the invention, a nest of cooling tubes 3 through which a coolant (water, for example) is intended to circulate, two of said tubes only being shown in FIG. 1, is arranged along the steel wall 2 internally to the metallic jacket 5 which is constituted by two corrugated sheets 6 and 7, said sheets being mounted one opposite the other against the wall of the lining membrane 2 in such manner as to form bulged zones such as the zone 8 which serve to house the cooling tubes 3 and permit of free peripheral expansion. In the particular form of embodiment of FIG. 1, said metallic jacket 5 is attached to steel bands 9 which are in turn secured to the lining membrane 2 by any suitable means, for example by means of screws such as the screw 10.

In a possible alternative form of embodiment which is more especially applicable to the thermal protection of a vertical wall, the rear sheet hangs from the top of the wall and forms a skirt which is capable of expanding freely at the bottom, the only contact between the rear sheet and the leak-tight lining membrane being established if necessary by a certain number of centering studs.

Figure 2:
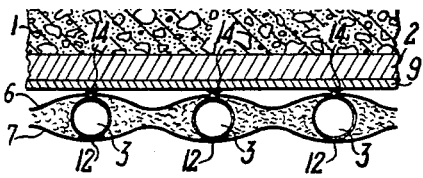
FIGS. 2 and 3 are alternative forms of embodiment of the same thermal barrier.

In the form of embodiment of FIG. 2, the sheets 6 and 7 are welded at 12 to the tubes 3 which are in turn secured to the steel bands 9.

Figure 3:
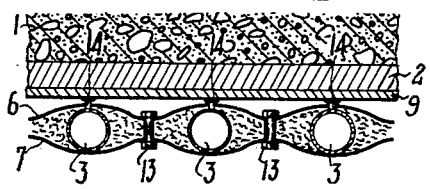

In the case of the alternative form of embodiment of FIG. 3, the sheets 6 and 7 are simply joined together half-way between the tubes 3 and 4 by means of suitable systems (screws, bolts or the like) such as those designated by the reference 13. Owing to the absence of any welded joints between the sheets and the tubes, the foregoing arrangement permits of a better distribution of thermal stresses in the sheets and prevents deformations of the tubes which are always liable to occur.

The space which remains free between the two sheets 6 and 7 can be filled with steel wool or glass or any other equivalent insulating material.

In all cases, the inner sheet 7 which can play the part of a thermal reflector is much thinner than the outer sheet 6; the ratio of thicknesses can exceed 1:20 when no provision is made for any insulating packing between the sheets.

The thin sheet 7 which is in contact with the reactor coolant gas provides a means of reducing to an appreciable extent the heat flux which passes from the gas to a cooling fluid which circulates through the tubes 3.

This last-mentioned feature is very important inasmuch as the rear sheet sheet is thereby made as isothermal as possible without having unnecessary thickness; in addition, when it is desired to maintain the concrete at a fairly low temperature, the heat flux which is removed at a low energy-level is thus reduced.

The sheet 6 has a fairly substantial thickness which in all cases is at least equal to 2 millimeters; in the case of a tube spacing of 20 centimeters and a variation of temperature of the rear membrane which does not exceed a few tens of degrees centigrade, it may prove necessary to make use of sheets having a thickness of several centimeters. Said sheet 6 must have a minimum thermal resistance in order to ensure that the leakage flux which results when a tube is cut out of the circuit, for example, accordingly flows in a correct manner.

The tubes, which are of the boiler-tube type, are spaced apart at a distance of 20 centimeters, for example. The sheet 6 is secured to the steel band 9 by means of welded fins 14. Accordingly, the attachment to the leak-tight lining membrane 2 is carried into effect by means of tubes which remain cold, thereby preventing hot points on said membrane 2.

There can be arranged in front of the inner sheet 7 thermal screens which are intended to reduce the heat flux which is absorbed by said sheet. If such thermal screens are not provided, the inner sheet (by virtue of its small thickness) reaches a temperature which is such that the additions of heat received by said inner sheet remain relatively small.

Figure 4:
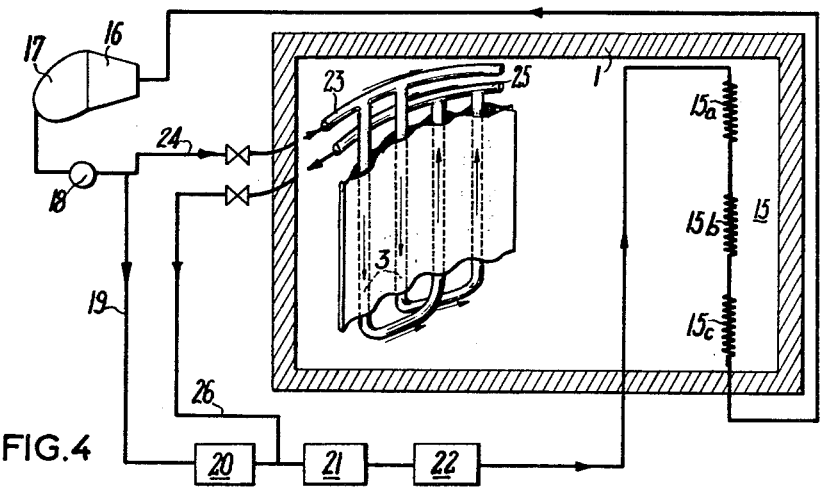
FIG. 4 is a flowsheet of the coolant water circulation system in the particularly advantageous case concerning the application of the invention to a nuclear reactor with integrated primary exchangers.

FIG. 4 shows diagrammatically the manner in which the tubes 3 of a nuclear reactor comprising an integrated primary exchanger can be supplied with water. Said FIG. 4 shows the casing 1 of the nuclear reactor inside which is located the primary exchanger 15, said exchanger consisting of the economizer 15a, the evaporator 15b, the superheater 15c. After expansion in the turbine 16 and condensation in the condenser 17, the water is circulated by the pump 18 in the main circuit 19 through successive reheaters 20, 21 and 22 until said water is admitted in the economizer 15a and is then subjected to a further cycle.

In an embodiment of this kind, the cooling tubes 3 of the thermal barrier in accordance with the invention are grouped together against the wall in a single layer of tubes consisting of two groups, each group of tubes being fed in parallel between a distributor 23 which is fed with cold water at 40° C. through a by-pass 24 of the circuit 19 and a collector 25, the water being heated to 70° C. in the example described; in the main circuit, the return is effected through the pipe 26 between the reheater 20 and the reheater 21. In the case of the temperatures which have been indicated, it is sufficient to provide 300 tubes of the boiler-tube type having a diameter of 36.5/41.5 and distributed in accordance with the invention over the internal surface of the steel lining membrane, there being established within said tubes a circulation of water at a flow rate of one meter per second with a view to removing 37 mw. of heat.

Since the thermal power to be removed is usually distinctly below this value, provision will be made for a throttling valve; by virtue of the opening of said valve, the system which is thus overdimensioned will accordingly make it possible to guard against certain incidents such as the appearance of strong currents of hot gas in contact with the tubes.

In accordance with the particular arrangements of the exchangers and of the vessel wall, certain nests of exchanger tubes or a certain number of the inlet or outlet pipes thereof can be arranged as a screen in front of the thin sheets 5.

Figure 5:
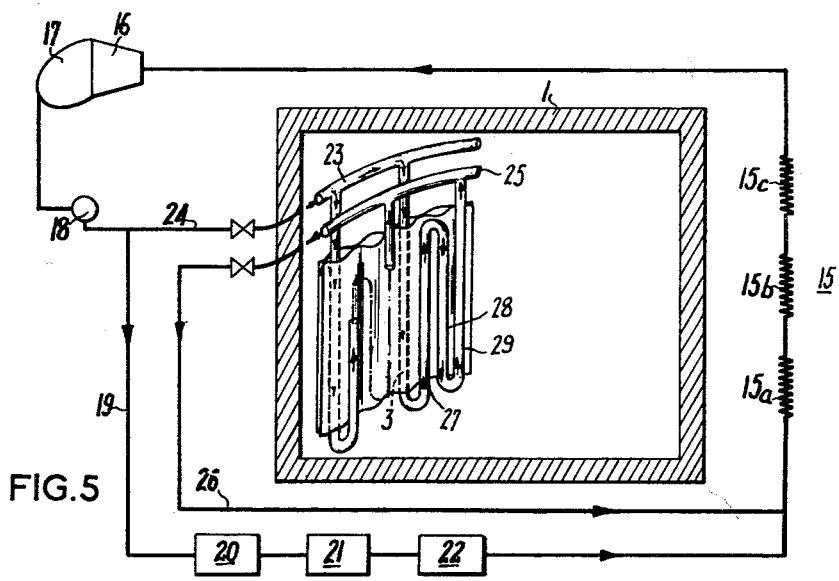
FIG. 5 illustrates one example of practical application in the case of a reactor with non-integrated exchangers.

In FIG. 5, there can again be seen the reactor vessel 1 and the tubes 3 for cooling the steel lining membrane, but the primary exchanger 15 is in this case located outside the reactor vessel.

In this example, the cold water distributor 23 is always at 40° C., but the collector 25 is at 160° C. The tubes are distributed in four successive layers 3, 27, 28 and 29, the jacket 3 of which in accordance with the invention is alone located in the vicinity of the vessel lining membrane; in the other successive layers, the water is heated respectively from 40° C. to 70° C., from 70° C. to 100° C., from 100° C. to 130° C., then from 130° C. to 160°

C. The outlet water, at 160° C., is finally channelled into the collector 25, then returned through the conduit 26 to the admission side of the primary exchanger 15.

A few particular numerical examples of a reactor with integrated exchangers, the core of which is cooled by a circulation of helium at 40 atmospheres, can now be given below by way of a second example.

Gas: helium at 40 atmospheres,
Integrated exchangers,
Helium inlet temperature to the core: 300° C.
Helium outlet temperature from the core: 750° C.
Temperature of concrete at surface: 150° C.
Temperature of water in tubes:
 Inlet—140° C.
 Outlet—150° C.
Pressure in the tubes: $\geqslant 5$ atmospheres,
Arrangement of the tubes: in 4 groups of 1 layer.

What I claim is:

1. Thermal barrier for the prestressed concrete vessel of a nuclear reactor which is cooled by a gas under pressure comprising a nest of spaced tubes parallel to the surface of the concrete and through which a coolant circulates, said tubes being disposed between at least one thin internal sheet and an external sheet in thermal contact with said tubes, said external sheet being of greater thickness than said oppositely facing internal sheet and said internal sheet being corrugated for facilitating thermal deformations.

2. Thermal barrier as described in claim 1, said internal sheet being of sufficiently small thickness and of a metal such as to offer to the thermal flow which takes place toward said tubes a substantial thermal resistance compared with the thermal resistance of the cooling gas which is in contact with said internal sheet.

3. Thermal barrier as described in claim 1, including a fluid tight lining for the concrete vessel, said external sheet being disposed opposite said lining and being of sufficient thickness to constitute a substantially isothermal surfaces which protects said lining.

4. Thermal barrier as described in claim 1 including means for reducing heat transfer interposed between said sheets.

5. Thermal barrier as described in claim 1 including means for improving the flow of heat along said external sheet toward said tubes.

References Cited by the Examiner

UNITED STATES PATENTS 3,016,462 1/62 Hendricksen et al.

OTHER REFERENCES

Power Reactor Technology, vol. 5, No. 1, page 34, December 1961.

CARL D. QUARFORTH, *Primary Examiner.*

REUBEN EPSTEIN, *Examiner.*